(12) United States Patent
Salzman et al.

(10) Patent No.: US 8,973,835 B2
(45) Date of Patent: Mar. 10, 2015

(54) SYSTEMS AND METHODS FOR COLLECTING PRIMARY AND SECONDARY DATA ASSOCIATED WITH SHIPPING CONTAINERS

(71) Applicant: United Parcel Service of America, Inc., Atlanta, GA (US)

(72) Inventors: David Ray Salzman, Alpharetta, GA (US); Carl M. Skonberg, Wyckoff, NJ (US)

(73) Assignee: United Parcel Service of America, Inc.

( * ) Notice: Subject to any disclaimer, the term of this patent is extended or adjusted under 35 U.S.C. 154(b) by 57 days.

(21) Appl. No.: 13/656,004

(22) Filed: Oct. 19, 2012

(65) Prior Publication Data

US 2013/0098989 A1 Apr. 25, 2013

Related U.S. Application Data

(60) Provisional application No. 61/550,221, filed on Oct. 21, 2011.

(51) Int. Cl.
*G06K 19/06* (2006.01)
*G06Q 10/08* (2012.01)
*G06Q 50/28* (2012.01)

(52) U.S. Cl.
CPC ............... *G06Q 10/08* (2013.01); *G06Q 50/28* (2013.01)
USPC ............... 235/492; 235/462.01; 235/462.13

(58) Field of Classification Search
CPC ..... G06K 7/14; G06K 17/00; G06K 19/0723; G02B 26/10
USPC .......... 235/454, 462.01, 462.13, 451, 462.46, 235/472.02, 492
See application file for complete search history.

(56) References Cited

U.S. PATENT DOCUMENTS

| | | | |
|---|---|---|---|
| 3,438,489 | A | 4/1969 | Cambornac et al. |
| 4,234,926 | A | 11/1980 | Wallace et al. |

(Continued)

FOREIGN PATENT DOCUMENTS

| | | |
|---|---|---|
| CA | 2345763 | 6/2000 |
| EP | 0 996 105 | 4/2000 |

(Continued)

OTHER PUBLICATIONS

Alien Technology, "2450 MHz Long Range Backscatter RFID System," website article, 6 pages, Jan. 29, 2004.

(Continued)

*Primary Examiner* — Paultep Savusdiphol
(74) *Attorney, Agent, or Firm* — Alston & Bird LLP

(57) ABSTRACT

In various embodiments, methods and systems are provided for capturing primary and secondary data associated with a product in a container or placed on a pallet. For example, a method may include (a) retrieving a primary data from a first data source physically associated with the product or container; (b) gathering secondary data using a second data source physically associated with the product or container, wherein the secondary data relates to at least one condition experienced by the product or the container; (c) retrieving the secondary data from a second data source, wherein the secondary data and the primary data are retrieved at substantially the same time; and (d) determining whether the at least one condition has transcended a limit. If a condition has transcended a limit, at least one alert may be generated and transmitted.

21 Claims, 6 Drawing Sheets

(56) References Cited

U.S. PATENT DOCUMENTS

| | | |
|---|---|---|
| 5,347,274 A | 9/1994 | Hassett |
| 5,433,311 A | 7/1995 | Bonnet |
| 5,489,017 A | 2/1996 | Bonnet |
| 5,497,140 A | 3/1996 | Tuttle |
| 5,547,063 A | 8/1996 | Bonnet |
| 5,684,705 A | 11/1997 | Herbert |
| 5,719,771 A | 2/1998 | Buck et al. |
| 5,774,876 A | 6/1998 | Woolley et al. |
| 5,892,441 A | 4/1999 | Woolley et al. |
| 5,936,523 A | 8/1999 | West |
| 5,971,587 A | 10/1999 | Kato et al. |
| 6,005,211 A | 12/1999 | Huang et al. |
| 6,249,227 B1 | 6/2001 | Brady et al. |
| 6,285,916 B1 | 9/2001 | Kadaba et al. |
| 6,294,997 B1 | 9/2001 | Paratore et al. |
| 6,483,434 B1 | 11/2002 | UmiKer |
| 6,496,806 B1 | 12/2002 | Horwitz et al. |
| 6,539,360 B1 | 3/2003 | Kadaba |
| 6,557,758 B1 | 5/2003 | Monico |
| 6,712,276 B1 * | 3/2004 | Abali et al. ............... 235/492 |
| 6,720,888 B2 | 4/2004 | Eagleson et al. |
| 6,721,617 B2 | 4/2004 | Kato et al. |
| 6,919,803 B2 | 7/2005 | Breed |
| 6,944,574 B2 * | 9/2005 | LeBlanc et al. ............ 702/187 |
| 7,009,517 B2 | 3/2006 | Wood |
| 7,035,856 B1 | 4/2006 | Morimoto |
| 7,149,658 B2 * | 12/2006 | Kadaba ..................... 702/184 |
| 7,454,315 B2 * | 11/2008 | Kadaba ..................... 702/184 |
| 7,930,142 B2 * | 4/2011 | Kadaba ..................... 702/184 |
| 2002/0098272 A1 | 7/2002 | Silver |
| 2003/0014143 A1 | 1/2003 | Kato et al. |
| 2003/0101069 A1 | 5/2003 | Sando |
| 2003/0163287 A1 | 8/2003 | Vock et al. |
| 2004/0008123 A1 | 1/2004 | Carrender et al. |
| 2004/0024644 A1 | 2/2004 | Gui et al. |
| 2004/0049315 A1 | 3/2004 | Sansone et al. |
| 2004/0100379 A1 | 5/2004 | Boman et al. |
| 2004/0100380 A1 * | 5/2004 | Lindsay et al. ............ 340/540 |
| 2004/0124977 A1 | 7/2004 | Biffar |
| 2004/0143354 A1 | 7/2004 | Kato et al. |
| 2004/0149826 A1 | 8/2004 | Alleshouse |
| 2004/0193449 A1 | 9/2004 | Wildman et al. |
| 2004/0243353 A1 | 12/2004 | Aghassipour |
| 2004/0257203 A1 | 12/2004 | Maltsev et al. |
| 2005/0073406 A1 * | 4/2005 | Easley et al. ............ 340/539.1 |
| 2005/0080566 A1 | 4/2005 | Vock et al. |
| 2005/0099292 A1 | 5/2005 | Sajkowsky |
| 2005/0116034 A1 | 6/2005 | Satake et al. |
| 2006/0109106 A1 * | 5/2006 | Braun ................... 340/539.13 |
| 2006/0255130 A1 | 11/2006 | Whewell et al. |
| 2006/0261946 A1 * | 11/2006 | Himberger et al. ........ 340/572.1 |
| 2006/0265181 A1 * | 11/2006 | Stewart ..................... 702/178 |
| 2007/0095905 A1 * | 5/2007 | Kadaba ..................... 235/384 |
| 2007/0241905 A1 * | 10/2007 | Himberger et al. ........ 340/572.1 |
| 2008/0030353 A1 * | 2/2008 | O'Toole et al. ............ 340/584 |
| 2008/0210702 A1 | 9/2008 | Lochinger et al. |
| 2008/0270270 A1 * | 10/2008 | Ramachandra et al. ........ 705/28 |
| 2010/0134257 A1 * | 6/2010 | Puleston et al. ............ 340/10.4 |
| 2010/0289669 A1 * | 11/2010 | Saltzman et al. ........ 340/870.17 |
| 2011/0169636 A1 | 7/2011 | Kadaba |
| 2012/0032803 A1 * | 2/2012 | Copeland et al. ......... 340/572.1 |
| 2012/0044055 A1 * | 2/2012 | Kovacic et al. ............. 340/10.1 |
| 2012/0206243 A1 * | 8/2012 | Butler et al. .............. 340/10.51 |

FOREIGN PATENT DOCUMENTS

| | | |
|---|---|---|
| WO | WO 02/26566 | 4/2002 |
| WO | WO 2005/022303 | 3/2005 |

OTHER PUBLICATIONS

Auto ID Center, "Auto-ID On the Move: The Value Of Auto-ID Technology In Freight Transportation," Accenture White Pages, pages Cover, 1-26, Nov. 1, 2002, Distribution Restricted To Sponsors Until Feb. 1, 2003, Cambridge, Massachusetts.

Fedex Custom Critical, "FedEx Custom Critical Launches Temp-Assure Validated$^{SM}$," Press Release, 1 page, Feb. 4, 2004, Akron, Ohio.

Syscan International Inc., "New RFID Based Solution For Perishable Products," Accelerating Business Efficiency, 1 page, May 20, 2003, Montreal, Quebec.

Sharp, "In Supply Chain Applications Such As Food Safety Monitoring, ADC Devices Go Beyond Mere Identification To Report On The World Around Them," A Sense of The Real World, pp. 1-8.

Sensitech, "Cold Chain Market Shipment Logistics System," Website Article from www.sensitech.com, pp. 13-15, 2001, Beverly, Massachusetts.

International Search Report and Written Opinion for International Application No. PCT/US 2004/032470 filed Sep. 30, 2004.

Matrics Group, "RFID Products," Website Article from http://Hyperlink "http://www.matricsgroup.com/rfid.asp" www.matricsgroup.com/rfid.asp, Dec. 13, 2001.

RFID Journal, "New Low-cost Temperature Sensor," Website Article from ww.rfidjournal.com/article/articleview/28/1/1/, Jul. 19, 2002.

Shreiner, "E-temp-label," Website Article from www.schreineronline.com/en/html/gb/medipharm/e-temp-label.htm#, Nov. 29, 2003.

"DHL and Partners Develop RFID Sensor Solution for Pharma Industry," *Freight e-Business News & Resources*, Dec. 21, 2006, http://www.eyefortansport.com/print.asp?news=54063.

"Deutsche Post World Net Starts "DHL Innovation Initiative" with IBM, Intel, Philips, and SAP," *DHL Press Release*, Feb. 16, 2006, DHL International GmbH.

"DHL Time/Temperature Recording Belgium," *RFID for Courier and Postal Services*, May 2004, IDTechEx Ltd.

"DHL and Partners Develop RFID Sensor Solutions for the Pharmaceutical Industry," *DHL Press Release*, Dec. 20, 2006, DHL International GmbH.

Davie, "Intelligent Tagging for Transport and Logistics: The ParcelCall Approach," *Electronics and Communication Engineering Journal*, Jun. 2002, pp. 122-128.

Search Report dated Mar. 22, 2011, European Application No. 10179509.4.

International Preliminary Examining Authority, International Preliminary Report on Patentability for International Application No. PCT/US2004/032470, dated Jan. 10, 2006, 11 pages, European Patent Office, The Netherlands.

International Searching Authority, International Search Report and Written Opinion for International Application No. PCT/US2012/60992, mailed Apr. 1, 2013, 8 pages, United States Patent and Trademark Office, USA.

* cited by examiner

SYSTEMS AND METHODS FOR COLLECTING PRIMARY AND SECONDARY DATA ASSOCIATED WITH SHIPPING CONTAINERS

CROSS-REFERENCE TO RELATED APPLICATIONS

This application claims priority to U.S. Provisional Application No. 61/550,221 filed Oct. 21, 2011, which is hereby incorporated in its entirety by reference.

BACKGROUND

Commerce often relies on the ability to successfully transport products from one location to another, in many cases over long distances. As products are transported, they may experience certain conditions that adversely affect the product. For example, perishable foods, pharmaceuticals, or biological tissue may be sensitive to temperature, moisture, pressure, and a variety of other environmental conditions which may be experienced during shipment. A shipment may include one or more packages. Some shipments may be sensitive to light or shippers, consignees or transportation companies may want to prove or disprove evidence of tampering concerning a particular package or shipment. Thus, it can be important for carriers to monitor various environmental conditions of certain products during transportation and storage. Accordingly, there is a need for systems and methods that allow carriers to efficiently collect information related to certain products and their shipping containers such as the environmental conditions experienced by these products, packages or shipments throughout the shipping process.

BRIEF SUMMARY

Various embodiments of the present invention provide improved systems and methods for monitoring conditions of a product, package and/or shipment during transport. In one aspect, a method for capturing primary and secondary data associated with a product in a container is provided. This method includes the steps of: retrieving a primary data from a first data source physically associated with the product or container; gathering secondary data using a second data source physically associated with the product or container, wherein the secondary data relates to at least one condition experienced by the product or the container; retrieving the secondary data from a second data source, wherein the secondary data and the primary data are retrieved at substantially the same time; determining whether the at least one condition has transcended a limit; and in response to a determination that the at least one condition has transcended the limit, generating and transmitting at least one alert.

In another aspect, a system for capturing primary data and secondary data associated with a product is provided. The system includes a first data source storing primary data and physically associated with the product or container and a second data source storing secondary data relating to at least one condition experienced by the product or the container and physically associated with the product or container. A scanner device is also provided that is configured to retrieve the primary data from the first data source, and the secondary data from the second data source at substantially the same time. Furthermore, a computing device is also provided that is configured to: determine whether the at least one condition has transcended a limit; and in response to a determination that the at least one condition has transcended the limit, generate and transmit at least one alert.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all, embodiments of the invention are shown. Indeed, these inventions can be embodied in many different forms and should not be construed as limited to the embodiments set forth herein; rather, these embodiments are provided so that this disclosure will satisfy applicable legal requirements. Like numbers refer to like elements throughout.

The following paragraphs describe novel and nonobvious systems and methods in which data capture technology is used in connection with a product delivery system. The systems and methods described herein capture and record primary and secondary data associated with a product and/or a container during movement through a common carrier's delivery system.

"Container" will be used herein to refer to virtually any object that can be used to enclose or hold a product, such as an envelope, packet, mailing tube, bag, box, package, can, bucket, crate, pallet, air or ocean shipping container, truck, van or other motorized vehicle, etc.

Figure 1:
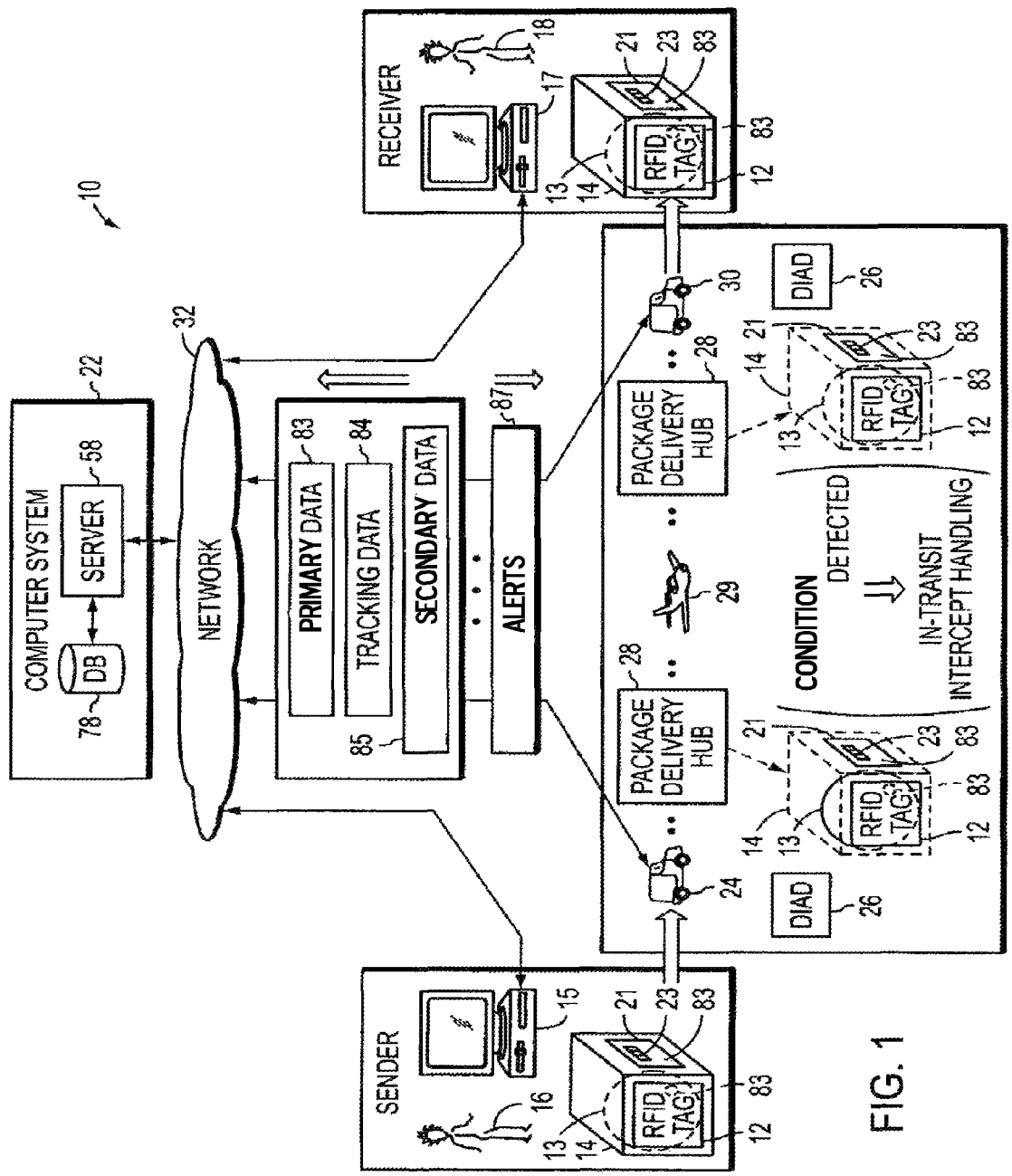
FIG. 1 is a view of a product delivery system that employs data capture technology to capture primary and secondary data associated with a product and/or container being shipped in accordance with an embodiment of the present invention.

FIG. 1 is a view of a product delivery system 10 that employs data capture technology to capture primary and secondary data in accordance with an embodiment of the present invention. The system 10 includes a first data source 21 and a second data source 12, which are physically associated with a product 13 in a container 14. The product 13 is to be shipped from a sender 16 to a receiver 18. The system 10 further includes a carrier logistics network 20 for shipping the container 14 with its product 13 and a computer system 22 for monitoring various aspects of the shipping process.

In one embodiment, the second data source 12 associated with the product 13 in the container 14 is a radio-frequency identification (RFID) sensor tag. As referred to herein, an RFID sensor may be an automated data collection device having an integrated sensor. As is known in the art, RFID sensor technology provides a wireless means of automated data collection that eliminates the need for a direct line of sight between a data reader and the RFID tag. This allows the sensor tag to be placed anywhere on or in the product 13 or the container 14. In other words, the sensor can be placed inside the container 14, it can be affixed to an outer surface of the container, or it can be positioned directly on the product 13 that is inside the container, for example. In particular embodiments, the sensor portion of the device 12 is capable of sensing one or more environmental conditions, such as temperature, pressure, vacuum, vibration, shock, acceleration, humidity, moisture, light, air, battery charge level for a battery on an environmental control container, and the presence or absence of a chemical or if a container has been tampered with. Tampering can be detected by placing a discreet sensor inside the container that stores information which identifies the container, for example, the delivery address or the container tracking number. The data received from the second data source can then be compared to the primary data received from the first data source to verify the authenticity of the primary data. Also, a sensor which detects light or a security wire can be used to determine if the container has been opened. These types of devices 12 are "off-the-shelf" products known to those of ordinary skill in the art. For example, an RFID sensor capable of detecting changes in one or more such environmental conditions is described in U.S. Pat. No. 6,294,997 issued to Paratore, which is hereby incorporated by reference.

In various embodiments, the product 13 and/or container 14 has a first data source 21 storing primary data 83 associated with the product and/or container 14. For instance, in particular embodiments, the first data source 21 may be a printed medium attached to the package or shipment with the primary data 83 printed thereon. For example, in one embodiment, the printed medium may comprise a conventional shipping label with the primary data 83 encoded in optically-readable form such as an alphanumeric character string, a one- or two-dimensional bar code, or other machine- or human-readable form. The primary data 83 may include, by way of example and not limitation, a tracking identifier 23 for uniquely identifying the product 13 and/or container 14 during the shipping process. In addition, the primary data 83 may be used by the computer system 22 to allow secondary data 85 (such as environmental data), and/or tracking data 84, to be associated with the product 13 and/or container 14 as it is shipped via the carrier's logistics network 20. In other embodiments, the first data source 21 may be a radio-frequency identification tag (RFID tag) with the primary data 83 stored therein.

As the product 13 in the container 14 is transported from the sender 16 to the receiver 18, scanning devices internal to the carrier's logistics network 20 may scan the primary data 83 on the container 14 and/or product 13, to generate tracking data 84 indicating the status of the product during transport. For example, the primary data 83 of the product 13 and/or container 14 may be scanned by a scanning device at one or more of a number of different points, such as by a driver 24 who picks up the package or shipment at the sender location 16 and uses a hand-held scanning device 26 to read the primary data 83 from the container 14, at hubs 28 that receive and sort the package or shipment and have equipment to scan the primary data 83, and finally by the delivery (or transport) driver 30 who delivers the package or shipment to the delivery location 18 and uses a hand-held device 26, to scan the primary data 83 to generate tracking data 84 prior to delivery.

The tracking data 84 can include data identifying the date, time, and place of particular events associated with the container 14 as it is transported from the sender 16 to the receiver 18 within the carrier's logistics network 20. Such events can include the arrival or departure of the container 14 at or from particular locations within the logistics network 20 of the carrier as the package or shipment is transported. Such tracking data 84 can also include the identity of persons handling the container 14, such as the pickup, transport or delivery driver, or a person acknowledging receipt of the package or shipment at a particular location by signing for the package or shipment. The tracking data 84 can be transmitted via a network 32 to the computer system 22 from the various scan locations, for storage therein. The computer system 22 can provide access to the tracking data 84 related to the product 13 via the network 32, so that a sender 16, a receiver 18, pickup, transport and delivery personnel, and potentially others, can determine the status of the product 13 during transportation of the product in the carrier's logistics network.

Similarly, in various embodiments, the same device that reads the first data source may also read the second data source 12 physically associated with the product 13, at one or more points along the shipping route. The type of data 85 obtained from the second data source 12 depends on the type of device used as the second data source. For instance, in particular embodiments, the second data source 12 may be a device capable of sensing one or more environmental conditions such as temperature, pressure, vacuum, vibration, shock, acceleration, humidity, moisture, light, air, battery charge level for a battery on an environmental control container, and the presence or absence of a particular chemical. In one embodiment, the second data source 12 is an RFID sensor, and the secondary data 85 is read by a scanning device, simultaneously or near simultaneously, while the scanning device is reading the primary data 83 from the first data source. Further, in one embodiment, the second data source 12 is operable to generate time data in association with secondary data 85 for indicating the time of sensing the secondary data 85 associated with the product 13 and/or container 14.

In other words, in particular embodiments, the second data source 12 can be used to record history data of conditions that a product 13 and/or container 14 are exposed to during transport. The capability to verify that one or more conditions have been maintained during the transport and storage of a product can be extremely important when shipping a variety of products that may require special handling such as pharmaceuticals, biological tissue, drugs, and perishable foods.

Various embodiments can also operate with other types of second data sources 12 known in the art. For example, in addition to detecting and recording data associated with a product 13 and/or a container 14, some second data sources 12 can be programmed to determine whether a particular condition of a product 13 and/or a container 14 has transcended a minimum or maximum limit or range, based on the secondary data 85 detected by the second data source. For instance, in one embodiment, data indicating whether a minimum or maximum limit or range was transcended is read from the second data source 12 at one or more points in the shipping process.

In some embodiments, rules may be established for triggering the visual indicators and/or the sending of data and/or alerts. For example, some embodiments may specify that a visual indictor (or the sending of data or alerts) is triggered after a minimum or maximum limit or range has been transcended for a predetermined number of readings (e.g., 3 simultaneous readings, 3 out of 5 readings) or a predetermined time frame. These rules may be programmed into the second data source, the scanner devices or the computer system 22.

In various embodiments, the second data source 12 can include a visual indicator that changes its physical properties in response to a condition transcending a minimum or maximum limit or range. For example, the visual indicator may include at least one light-emitting diode (LED). The LED may be used to signify that a particular condition has transcended a minimum or maximum limit or range by, for example, transitioning from a non-illuminated state to an illuminated state, or by being illuminated so as to change from a first color (e.g., green) to a second color (e.g., red) in response to the condition of the contained product 13 transcending a minimum or maximum limit or range. These types of visual indicators can be used to alert personnel handling such containers 14 of the need to take appropriate action with regard to the product 13 and/or container 14 that has been exposed to an unacceptable condition.

Although some embodiments use LEDs as visual indicators to indicate exposure of a product 13 and/or a container 14 to a particular condition, other embodiments may use other indicators in conjunction with or in place of LEDs. These other indicators may make use of virtually any indicator that changes its visual appearance or other physical property in response to a particular condition occurring with respect to the container 14. For example, a machine-readable or human-readable output may be displayed on electronic paper (e.g., an alert, barcode, QR code, or MaxiCode displayed on an E-ink Vizplex display) or security wire or seal may be used. Such indicators may be one that permits sensing of the second data source's state without requiring line of sight or it can be one that requires line of sight, or even contact, in order to read the second data source's state indicating whether the product 13 and/or container 14 has been exposed to a particular condition. Possible visual indicators that can be used in various embodiments of the invention include temperature-sensitive visual indicators such as paper thermometers or thermo-labels, liquid crystal temperature strips which change color in response to changes in temperature, per hydronium (pH) strips which change color in response to the pH of the product's environment, electrochemical sensor strips that change color in the presence of a chemical or element, sensor strips that measure an condition such as the amount of ultraviolet light or other wavelength range, pressure-sensitive strips, and other devices.

As mentioned above, a relatively complete record of a detected condition to which a product 13 and/or container 14 have been subjected during shipment and storage can be obtained by a second data source 12 that senses the condition periodically or otherwise along its route and stores sensed secondary data 85 for later retrieval by a scanning device. How frequently the second data source 12 should sample and store measurements as secondary data 85 may depend upon the nature of the product 13 and/or container 14 and its sensitivity to exposure to the condition. In addition, it should be understood that in particular embodiments, the second data source 12 may be configured to determine whether a condition being experienced by the product 13 and/or container 14 has transcended prescribed limit or range values. Thus, the second data source 12 can provide data indicating an alert to the scanning device, which in turn relays this data to the carrier computer system 22. In other embodiments, the second data source 12 may merely store secondary data 85 which is read by a scanning device and provided to the carrier computer system 22, which may perform a determination to establish whether the condition has transcended the prescribed limit values or ranges. Thus, depending on the embodiment, the second data source 12 can be merely a sensor device, or alternatively, in addition to storing secondary data, it can perform processing to determine whether the product 13 and/or container 14 have been subjected to a particular condition, and if so, can transmit alert data to the carrier computer system 22 via the scanning device over a network 32.

Figure 2:
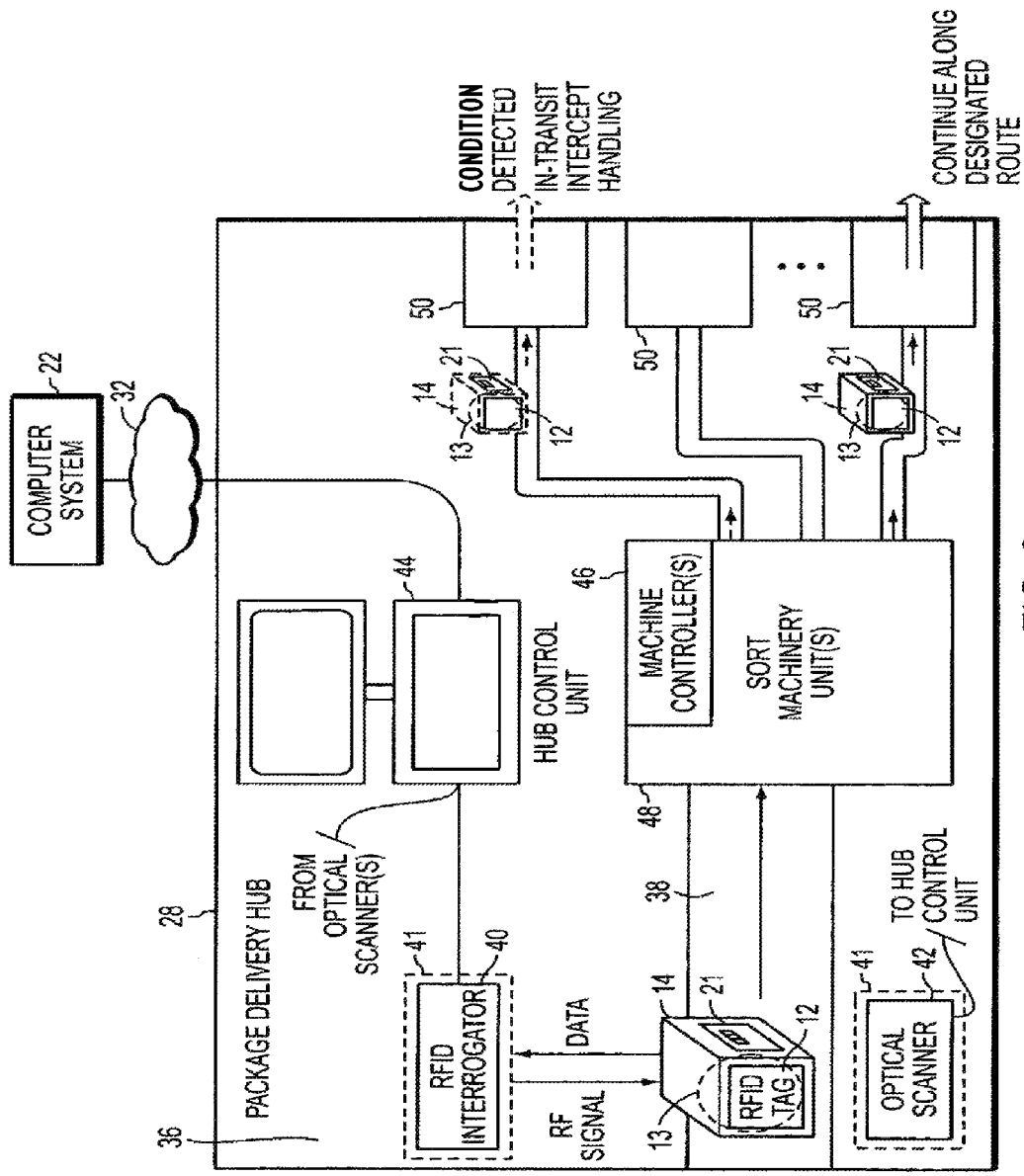
FIG. 2 is a view of a sortation system in which primary and secondary data associated with a product and/or a container being shipped are captured in accordance with an embodiment of the present invention.

FIG. 2 shows a sortation system 36 in which primary and secondary data associated with a product 13 and/or a container 14 being shipped are captured in accordance with an embodiment of the present invention. In this embodiment, the sortation system 36 includes a conveyor belt 38, a scanning device 41 configured to function as a RFID interrogator 40 and an optical scanning device 42, a hub control unit 44, one or more machine controller(s) 46, and one or more sort machinery unit(s) 48. The sortation system 36 described herein can be used in a carrier hub facility and/or as part of a pre-load sortation system. A carrier hub facility is typically an interim facility where contained products or packages or shipments are sorted for shipment to other carrier facilities in route to their ultimate destinations. In contrast, products and their containers that pass through a pre-load sortation system are sorted onto vehicles and delivered to their final destination. Although the following paragraphs describe this embodiment of the sortation system 36 in the context of a carrier hub facility 28, one of ordinary skill in the art will readily recognize that this embodiment is equally advantageous in the pre-load sortation context, or in any other sortation operation.

A container 14 having a first data source 21 and a second data source 12 arrives at a carrier hub facility 28 and is placed on a conveyor belt 38 or is moved via forklift or tractor, which takes the package or shipment to the sortation system 36. The first data source 21 in the illustrated embodiment is a shipping label with primary data 83 indicating the shipping address of a receiver 18 to which the container 14 is to be sent. In this particular embodiment, the second data source 12 associated with the container 14 is a radio-frequency identification (RFID) sensor. As the container 14 moves on the conveyor belt 38 or via forklift or tractor to the sortation system 36, the scanning device 41, simultaneously or near simultaneously, captures the primary data 83 and secondary data 85. In various embodiments, the scanning device 41 uses RFID interrogator 40 to capture the secondary data 85 by reading the RFID sensor and also captures the primary data from the shipping label. In another embodiment, the shipping address data is read from a shipping label on the container 14 using the optical scanning device 42 capability of the scanning device 41.

Depending on the embodiment, the RFID sensor 12 can be active (e.g., a Bluetooth® sensor, low-energy Bluetooth® sensor, or other active RFID sensor), battery-assisted passive (e.g., PowerID BAP sensor or other battery-assisted passive sensor), or passive (e.g., a passive UHF sensor, passive HF sensor, electronic article surveillance sensor, or other passive RFID sensor). In general, an active sensor uses a battery(ies) to power its tag radio transmitter and receiver (or transceiver). In contrast, a passive tag derives its power from the RFID interrogator 40 used to read it. It responds to the interrogator's signal with a signal modulated by the data stored therein. A passive tag does not typically use a battery to boost the energy of the reflected signal. However, a passive tag may use a battery to maintain memory in the tag or power the electronics that enable the tag to modulate a signal responsive to an interrogator's signal requesting the sensor to provide data (e.g., battery-assisted passive). The selection of the second data source 12 for a particular application may depend upon one or more of the above stated considerations regarding RFID sensors and their operation.

When the interrogator 40 capability of the scanning device 41 reads the RFID sensor 12 associated with the container 14, secondary data 85 is captured and may be sent by the interrogator 40 to the hub control unit 44. Additionally, the optical scanning device 42 capability of the scanning device 41 may read the primary data 83 associated with the package or shipment and send the primary data 83 to the hub control unit 44. As mentioned, in particular embodiments, minimum or maximum limits or ranges can be stored on the sensor and read by the interrogator 40, or they can be stored in a data storage device that is accessible by the hub control unit 44. If the hub control unit 44 determines that a particular condition the product 13 and/or the container 14 have experienced (e.g., determines the package has been exposed to a temperature of 100° F.) has transcended a minimum or maximum limit or range based on the secondary data 85, the hub control unit 44 may generate some type of signal to alert carrier personnel of the condition.

Continuing with FIG. 2, in one embodiment the computer system 22 can be configured to generate one or more alerts for the container 14 based on the secondary data 85 read from the second data source 12. To accomplish this, the hub control unit 44 transmits the secondary data 85 to the computer system 22 via the network 32. Preferably, the hub control unit 44 also transmits at least a portion of the primary data 83 and tracking data 84 associated with the product 13 and/or container 14 to the computer system 22 via the network 32. In one embodiment, the portion of primary data 83 comprises a tracking identifier 23 for uniquely identifying the product 13 and/or container 14 during the shipping process, and the tracking data 84 comprises time and location data identifying when and where, respectively, the scanning of the container 14 took place. The computer system 22 is operable to determine whether the product 13 within the container 14 has experienced a condition that transcended a minimum or maximum limit or range based on the secondary data 85. The minimum or maximum limit or range can be included in the secondary data 85 read from the second data source 12 and transmitted to the computer system 22 via the network 32, or the limits can be stored in a database that is accessible by the computer system 22 using the portion of the primary data 83 associated with the product 13 and/or container 14. In particular embodiments, if the computer system 22 determines that the condition has transcended a minimum or maximum limit or range based on the secondary data, the computer system 22 generates one or more alerts and transmits the one or more alerts via the network 32 to one or more points within the carrier's logistics network 20, including but not limited to, the hub 28 from which the secondary data 85 was received.

Figure 3:
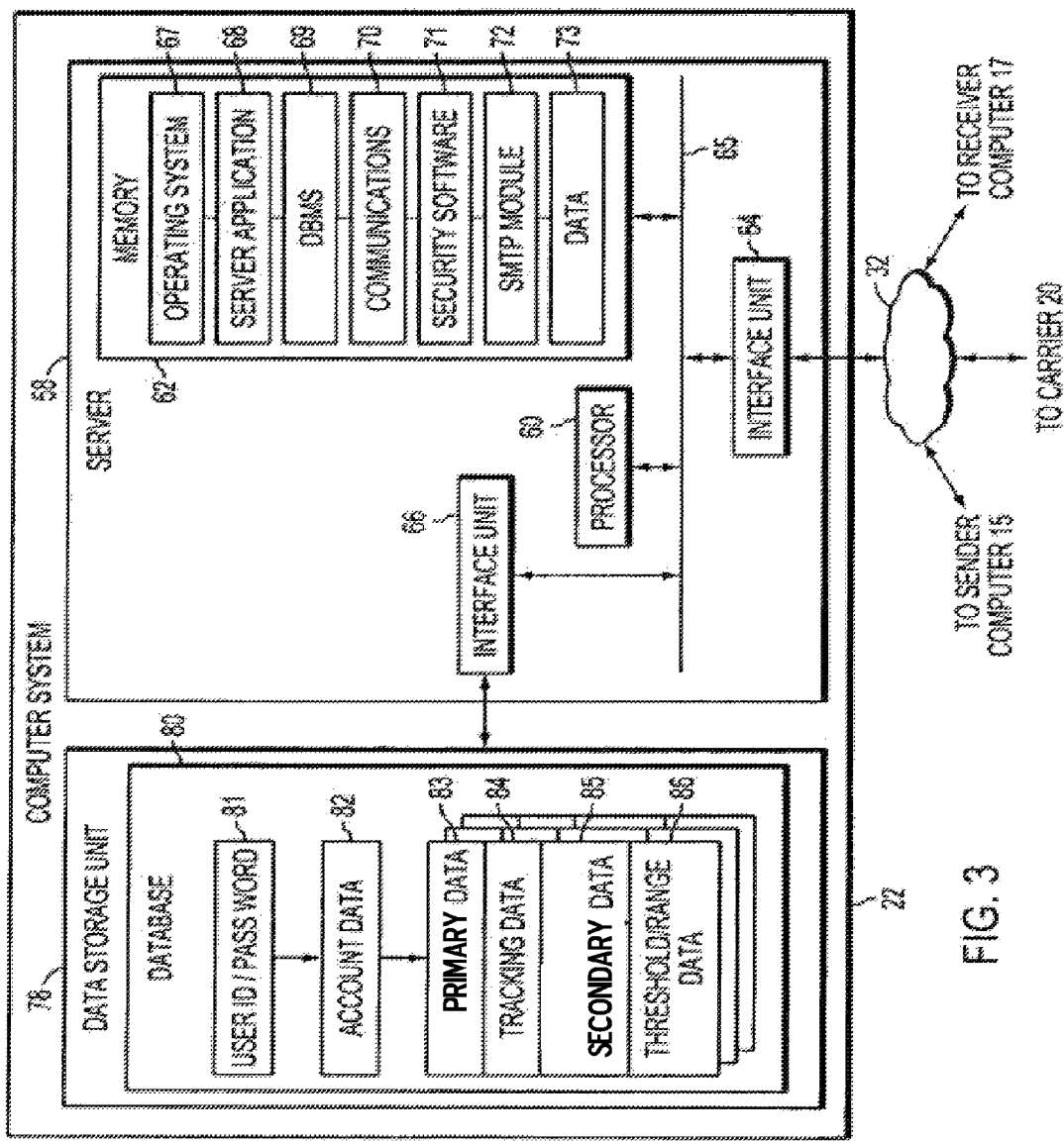
FIG. 3 is a block diagram of a computer system in accordance with the invention depicted in FIGS. 1-2.

FIG. 3 shows a block diagram of a computer system 22 in accordance with the invention depicted in FIGS. 1-2. The computer system 22 includes a server 58 and a data storage unit 78. The server 58 comprises a processor 60 and memory 62. The server 58 can also comprise interface units 64, 66, and bus 65. The processor 60 can be coupled via the bus 65 to receive and transfer signals and/or data to and from the memory 62 and interface units 64, 66 as it executes various software code stored in the memory 62. More specifically, the memory 62 stores various software executed by the processor 60, including an operating system 67 for controlling the allocation and usage of hardware resources; a server application 68 for processing primary data 83, tracking data 84, and secondary data 85 received from the carrier logistics network 20. The server application 68 can be executed by the server 58 to store the data 83, 84, 85 in the data storage unit 78. The server application 68 can be executed by the server 58 to generate one or more alerts to be provided to machinery and/or worker(s) within the carrier logistics network 20.

The memory 62 can store a database management system (DBMS) 69 for generating commands to store, modify, delete, retrieve, join, divide, etc. data in the data storage unit 78. The memory 62 can store a communication module 70 for handling communications and data transmitted to and from, respectively, the server; security software 71 for performing user authentication and other security-related services such as encryption and decryption of data transmitted and received by the server; and a simple mail transfer protocol (SMTP) module 72 to be used in one embodiment of the invention when sending and/or receiving email notifications over a network 32. The memory 62 can include a data storage area or buffer 73 that can be used by any of the software modules listed above to store and retrieve data generated or required in the execution of such code. The first interface unit 64 is used by the processor 60 to send and receive data over a network 32, and the second interface unit 66 is used to transfer data between the server 58 and the data storage unit 78.

The data storage unit 78 stores a database 80. In one embodiment, the database 80 contains records of related data fields including a user ID and password 81, and account data 82 associated with the user ID and password. For each container 14 and its product 13 that are associated with a user account, the database 80 contains identification data 83 stored in association with tracking data 84 and secondary data 85. In particular embodiments, the primary data 83 may include a tracking identifier 23 such as a "1Z" alphanumeric character string for uniquely identifying the container 14 during the shipping process. The tracking data 84 can include data identifying the date, time, and/or place of particular events associated with the container 14 as it is transported from a sender 16 to a receiver 18 within a carrier's logistics network 20. Such events can include the arrival or departure of the container 14 at or from particular locations within the logistics network of the carrier 20 as the package or shipment is transported. The tracking data 84 can also include the identity of persons handling the package or shipment, such as the pickup, transport or delivery driver, or a person acknowledging receipt of the package or shipment at a particular location by signing for the package or shipment.

In particular embodiments, the secondary data 85 includes at least one measurement of a condition the product 13 and/or container 14 experienced/were exposed to, such as, for example, temperature, pressure, vacuum, vibration, shock, humidity, moisture, light, air, battery charge level, and a chemical. Furthermore, the data storage unit 78 can store limit/range data 86, which defines the limit or range of measurements of a condition prescribed to be acceptable under shipment. For example, the limit/range data 86 can be used by the processor 60 to determine whether a product 13 has been subjected to a condition adversely impacting the product by comparing the secondary data 85 with the limit/range data 86 to determine whether an acceptable limit has been transcended. The resulting determination can be used by the processor 60 to generate one or more alerts for the product 13 and/or the container 14 accordingly.

Figure 4:
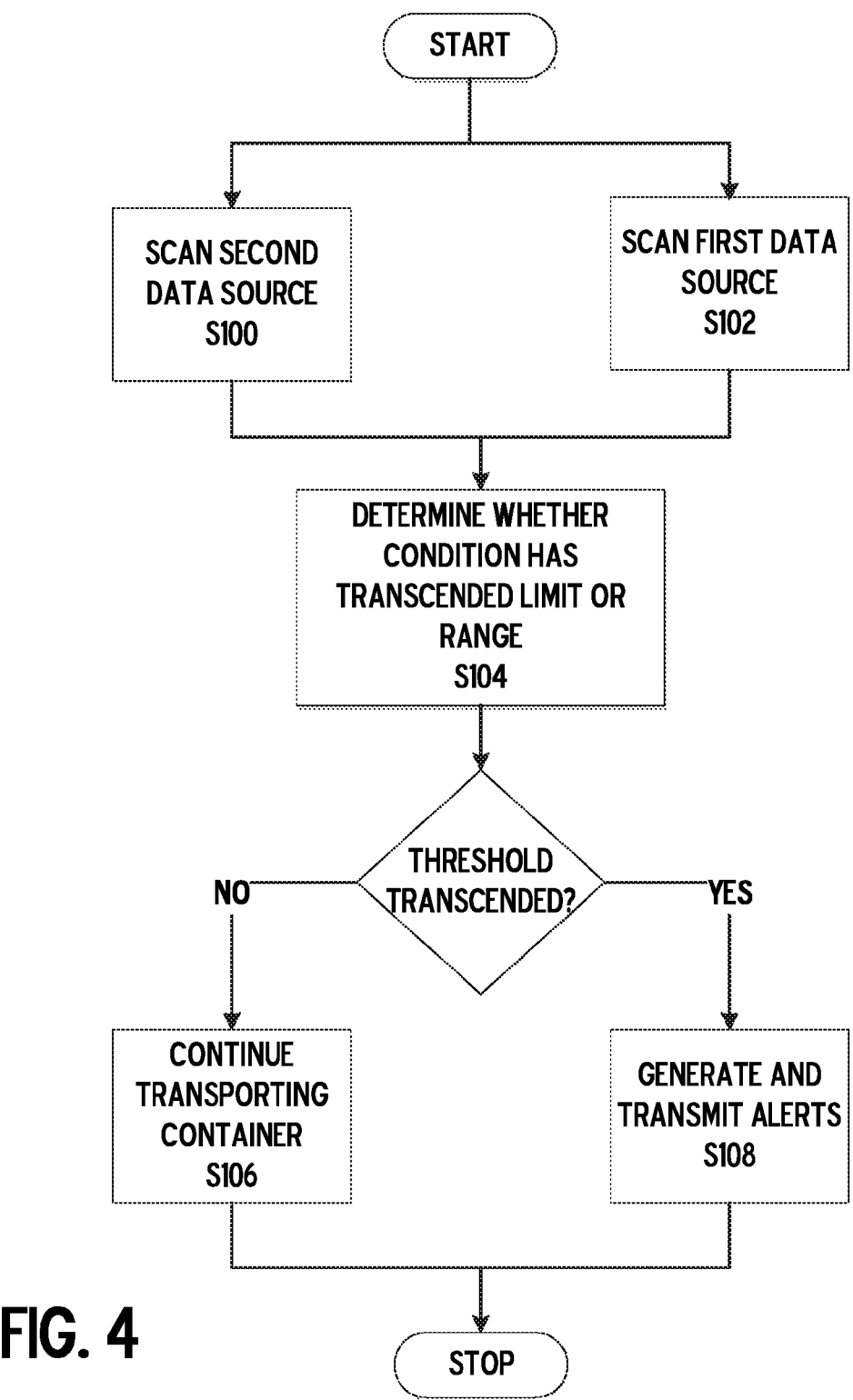
FIG. 4 is a process flow diagram of steps of a method for capturing primary and secondary data associated with a product and/or a container being shipped in accordance with an embodiment of the present invention.

FIG. 4 is a process flow diagram that illustrates the steps for transporting a product 13 in a container 14 and simultaneously measuring both primary data 83 and secondary data 85, such as environmental and/or other types of condition data, in accordance with an embodiment of the present invention. As previously described, in particular embodiments, a scanning device is configured so that it can read the primary data 83 and the secondary data 85 at substantially the same time. For instance, in one embodiment, a scanning device is used that includes bar code capability and RF capability. For example, the scanning device may be originally configured to read data from a bar code and to transmit the data over a RF communication channel. In this particular example, the scanning device may be re-configured so that the device's RF capabilities may also read data from an RFID sensor. Similarly, in other examples, the scanning device may include bar code capability and one or more of Bluetooth® or Wi-Fi capabilities and may be configured to read data from a bar code and to transmit the data over a Bluetooth® and/or Wi-Fi communication channel. Thus, for these particular examples, the scanning device may be re-configured so that the device's Bluetooth® and/or Wi-Fi capabilities may also read data from some type of second data source.

In various embodiments, re-configuring such scanning devices provides an advantage because carriers may institute various embodiments of the invention without having to purchase and install new equipment. In many instances, carriers need only to re-configure equipment (e.g., bar code scanning devices) already installed in their facilities to practice various embodiments of this invention. In addition, the re-configuration of these scanning devices may provide an additional advantage in various embodiments because the re-configuration results in the collection of primary and secondary data without having to expend additional labor in order to collect both types of data. Often, carriers are required to expend additional labor in order to gather data from a second data source during the shipping process. However, for various embodiments of the invention, multiple data sources may be read using one device and the additional labor often needed to read multiple data sources can be eliminated.

Turning to FIG. 4, at step S100, at the time the scanning device scans a first data source, such as a bar code on the container 14, the scanning device also scans a second data source physically associated with the product 13 in the container 14 at a location within the carrier's logistics network 20, to read secondary data 85 from the second data source. As previously mentioned, the container 14 may be an individual package or shipment, a shipping container, or any other type of container enclosing a product that is transported from a sender 16 to a receiver 18. In various embodiments, the second data source 12 may be a radio-frequency identification (RFID) sensor tag, and the scanning device is configured to function as a RFID interrogator that transmits and receives radio frequency signals from the tag in the performance of the scanning step. In other embodiments, the second data source associated with the product 13 and/or container 14 may be a shipping label 21 affixed to the container 14, an indicator, or some other tag physically associated with at least one of the product 13 and/or container 14.

The nature of the secondary data 85 obtained in the scanning step depends on the type of device used. For instance, in various embodiments, the second data source 12 may be capable of sensing one or more environmental conditions to which the product 13 and/or container 14 is subjected, such as temperature, pressure, the presence or absence of a vacuum, vibration, shock, humidity, moisture, light, air, and the presence or absence of a particular chemical. Other conditions may also be sensed such as the battery charge level for a container having environmental controls. In addition, in various embodiments, the second data source 12 may be configured to generate secondary data 85 that comprises time data generated in association with a corresponding condition the product 13 and/or container 14 is being subjected for indicating the time of sensing the condition associated with the product 13 and/or container 14. Further, particular embodiments, the second data source 12 may be programmed to determine whether the particular condition of the product 13 and/or container 14 has transcended a minimum and/or maximum limit, or a range of permissible values, based on the secondary data 85.

In yet other embodiments, the second data source 12 may comprise a visual indicator operable to signify that the condition of the product 13 and/or container 14 has occurred and/or has transcended a minimum and/or maximum limit or range. For example, the visual indicator may include at least one light-emitting diode (LED) illuminated so as to change from a first color to a second color in response to the detection of the condition and/or the transcending of the condition from a minimum and/or maximum limit or range. For example, in one embodiment, the sensor measures temperature and is included within the container 14 and an LED display is provided near the tracking bar code placed on the outside of the container 14. In this particular example, when the scanning device 41 reads the parcel's tracking bar code (primary data 83), the scanning device 41 simultaneously or near simultaneously reads a temperature fault alert (secondary data 85) from the blinking LED display. Thus, in this example, the scanning device 41 reads both the primary and secondary data without additional operator effort and/or use of additional equipment. Other types of second data source 12 previously mentioned can also be used effectively in the system 10.

At step S102 of FIG. 4, a scanning device 41, simultaneously or near simultaneously, reads primary data 83 from at least one of the product 13 and/or the container 14. For instance, in one embodiment, the primary data 83 is stored on a shipping label 21 affixed to the container 14, or some other tag associated with at least one of the product 13 and/or the container 14. In particular embodiments, the primary data 83 preferably includes a tracking identifier 23 that uniquely identifies at least one of the product 13 and/or container 14. The tracking identifier 23 may be an identifier that is typically used by a carrier to track packages or shipments. Alternatively, the primary data 83 may be Electronic Product Code™ indicia embedded in memory contained within a smart tag or chip on a particular product.

In particular embodiments, at step S104, a computer system connected to receive the scanned data from the scanning device 41 used in the above-indicated steps determines whether the condition associated with the product 13 and/or container 14 has transcended a minimum or maximum limit or passed outside of a prescribed range based on the secondary data 85. In one embodiment, the computer system performing the determining step is the hub control unit 44 of the hub 28 of FIG. 2. In another embodiment, the determining step can be performed by the computer system 22 of FIGS. 1-2. In this embodiment, the scanned data can be transmitted via a network 32 to the computer system 22, which then determines whether the condition of the product 13 and/or container 14 has transcended a minimum or maximum limit or range based on the secondary data 85. In response, the computer system 22 may generate one or more alerts based on the determining step, and may transmit the alerts to one or more points within the carrier's logistics network 20, such as a hub 28 or a driver 30.

Depending on the embodiment, the minimum or maximum limits defining a limit or range of permissible values may be stored in the second data source 12, or they may be stored in a database accessible by the carrier 20. If the secondary data 85 indicates that no limit or range has been transcended, then at step S106 of FIG. 4, the carrier continues transporting the product and container 14 to the receiver 18 identified in the shipping address data. However, in particular embodiments, if it is determined that the minimum or maximum limit has been transcended based on the secondary data 85, then at step S108, one or more alerts may be generated and transmitted to warn carrier personnel of the condition. As a result, the product 13 and container 14 may be transported differently than would otherwise be used in the performance of step S106. For example, the result of transcending a particular limit or range may require that the product 13 and container 14 to be rerouted to an alternate destination. The alternate destination may be a disposal site, or a different receiver than the receiver 18 to whom the product and container 14 were originally to be sent. In particular embodiments, the alternate destination may be identified by the secondary data stored on the second data source 12, or may be stored in a database accessible by the computer system 22.

Figure 5:
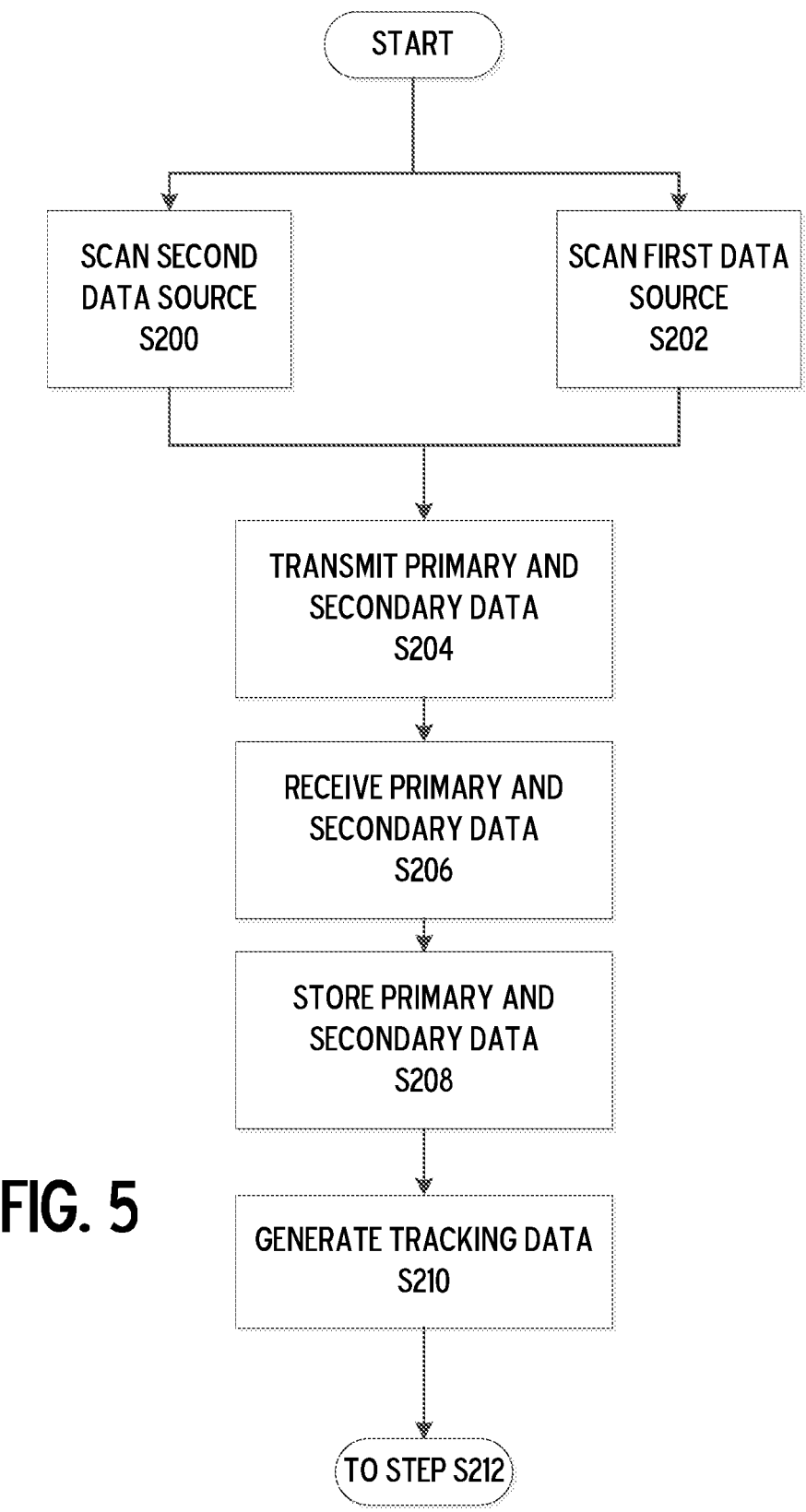
FIGS. 5-6 are process flow diagrams of steps of a method for providing history data of the monitored data recorded during shipment in accordance with an embodiment of the present invention.

FIG. 5 is a process flow diagram that illustrates the steps for generating history data indicating the conditions to which a product 13 and/or a container 14 were subjected during shipping in accordance with an embodiment of the present invention. One advantage to generating such history data is that it allows the carrier, customers, and other authorized personnel to analyze the data so as to look for possible patterns of conditions that may be occurring during certain times and/or at certain places within a carrier's logistics network 20. This can be beneficial for testing the durability and effectiveness of different types of packaging under a variety of conditions. Additionally, the history data provides both carrier and customers with the ability to look for adverse conditions that may be recurring at various points along particular shipping routes. In some cases, upon detecting such a problem, a customer may be able to request that shipments of a particular type of product 13 be shipped via an alternate route so as to avoid the adverse condition(s) associated with a particular shipping lane within the carrier's logistics network 20. Similarly, the carrier can use the data as a diagnostic tool to help identify and correct recurring problems within its logistics network 20.

At step S200, a scanning device 41 scans a second data source 12 physically associated with a product 13 and/or a container 14 to read secondary data 85 from the second data source. The container 14 may be an individual package or shipment, a shipping container, or any other type of container enclosing a product 13 that is transported from a sender 16 to a receiver 18. In one embodiment, the second data source 12 is a radio-frequency identification (RFID) sensor tag, and the scanning device 14 is configured to operate as a RFID interrogator 40 that transmits and receives radio frequency signals from the tag in the performance of the scanning step.

At step S202, the scanning device 41, simultaneously or near simultaneously, reads primary data 83 from the product 13 and/or the container 14. Depending on the embodiment, the primary data 83 may be stored on a shipping label 21 affixed to the container 14 or some other tag physically associated with the product and/or container. Thus, in this instance, the scanning device 41 is configured to read the primary data from a first data source 21 (e.g., shipping label) and read the secondary data from a second data source 12 (e.g., sensor).

In particular embodiments, the primary data 83 includes a tracking identifier 23 that uniquely identifies at least one of the product 13 and/or the container 14. The tracking identifier 23 can be an identifier that is typically used by a carrier to track packages or shipments, or it may comprise Electronic Product Code™ indicia or data embedded in a memory chip contained within a smart tag on a particular product. At step S204, the primary data 83 and the secondary data 85 are transmitted via a network 32 from the scanning device 41 to a computer system 22.

At step S206 of FIG. 5, the primary data 83 and secondary data 85 are received at the computer system 22 via the network 32 from the scanning device 41 performing the scanning. The computer system 22, in step S208, stores the secondary data 85 in association with the primary data 83 in the computer system 22. At step S210, tracking data 84 is generated. This can be done, for example, by configuring the scanning device 41 to "timestamp" the scanned data in a manner known in the art. In another embodiment, the computer system 22 can be programmed to identify the particular location of the scanning device 41 based on a received scanning device ID number, so that when the computer system 22 receives tracking data in association with a particular scanning device ID number, the computer system 22 can refer to a database to retrieve this data. The tracking data 84 can comprise time, date, and/or location of the product 13 and container 14 during the performance of the scanning. The tracking data 84 can further comprise data indicating such things as the identity of persons handling a container 14, such as a pickup, transport or delivery driver, or a person acknowledging receipt of the package or shipment at a particular location by signing for the package or shipment.

Figure 6:
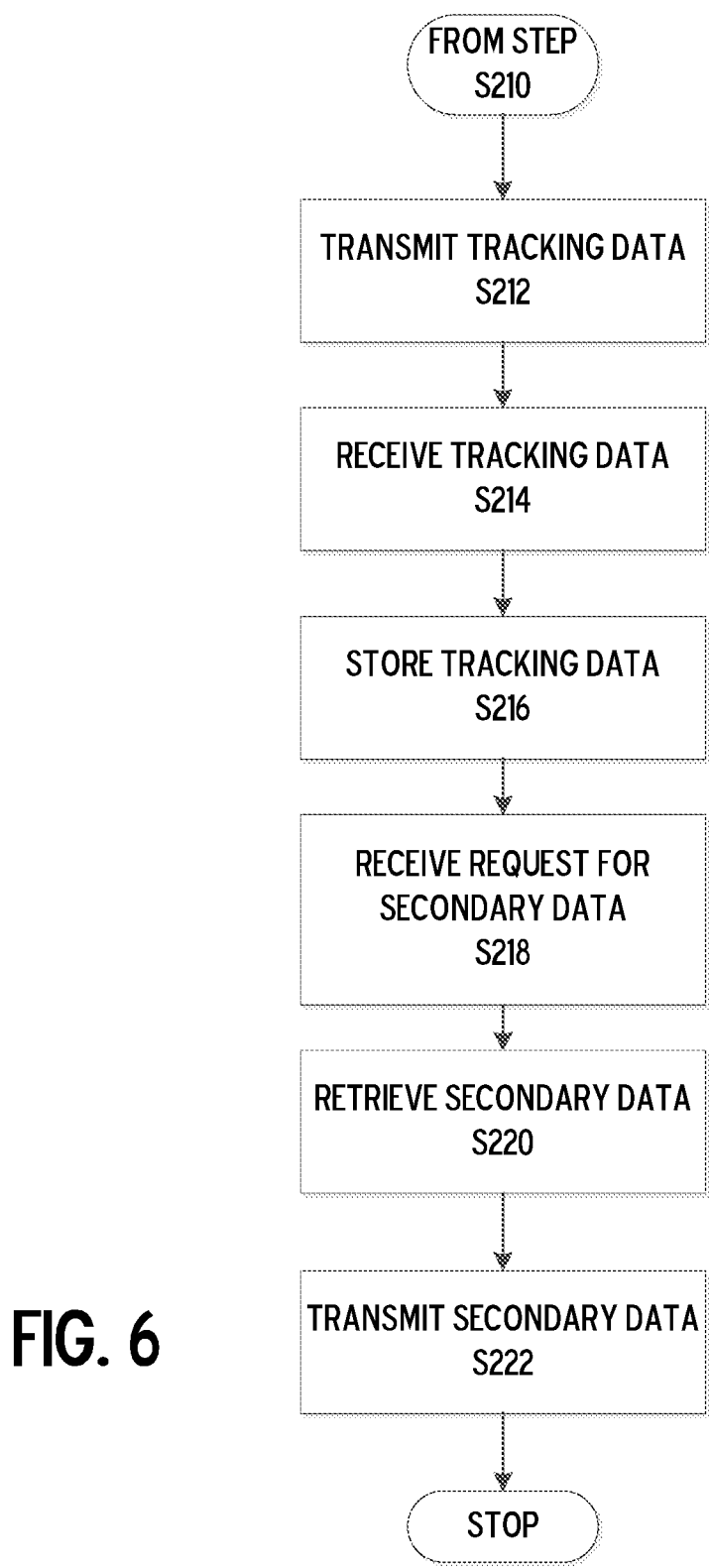

Turning now to FIG. 6, the process continues at step S212, wherein the tracking data 84 is transmitted via the network 32 to the computer system 22 from the scanning device 41 performing the scanning. The tracking data 84 is received at the computer system 22 at step S214, and in step S216 the tracking data 84 is stored in association with the primary data 83 and the secondary data 85 in the computer system. The data stored in the computer system 22 provides history data indicating conditions to which the product 13 and/or the container 14 has been subjected to at a plurality of locations and times in the transporting of the product.

At step S218, the computer system 22 receives via the network 32 a request from a user of a computing device to access the secondary data 85 associated with the product 13 and/or the container 14. In particular embodiments, the request may include a portion of the primary data 83 in order to identify the product 13 and/or the container 14. In addition, the request may include user identification data, such as a username and password 81, to be used by the computer system 22 in determining whether a particular user is authorized to access the secondary data 85. Based on the data in the request, at step S220 the computer system 22 retrieves the secondary data 85 that the user is authorized to access, and in step S222 the computer system transmits the secondary data 85 in association with the tracking data 84 from the computer system to the computing device via the network 32.

Many modifications and other embodiments of the invention set forth herein will come to mind to one skilled in the art to which this invention pertains having the benefit of the teachings presented in the foregoing descriptions and the associated drawings. For example, those skilled in the art will recognize that the functionality of the computer system 22 as described in FIG. 3 can be carried out on a plurality of computers capable of communicating via a network 32 such as the Internet or other communication network, and, accordingly, need not be discussed here for an understanding of the subject invention. In other words, rather than have a single server 18 to perform the described functions, these functions can be executed by two or more distributed computers, and such modification is expressly contemplated to be within the scope of this invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for capturing primary and secondary data associated with a product in a container comprising the steps of:
   retrieving primary data from a first data source physically associated with the product or container;
   gathering secondary data using a second data source physically associated with the product or container, wherein the secondary data relates to at least one condition experienced by the product or the container;
   retrieving the secondary data from the second data source, wherein the secondary data and the primary data are retrieved at substantially the same time;
   comparing the secondary data against stored rules, wherein the stored rules comprise one or more limits for the at least one condition and define an acceptable number of instances during which the at least one condition transcends at least one of the one or more limits to be at least one;
   determining whether the at least one condition has transcended at least one of the one or more limits;
   determining the number of instances during which the at least one condition has transcended at least one of the one or more limits; and
   in response to a determination that the at least one condition has transcended at least one of the one or more limits on more than the acceptable number of instances during which the at least one condition transcends at least one of the one or more limits, generating and transmitting at least one alert.

2. The method according to claim 1, wherein retrieving a primary data comprises optically scanning the first data source.

3. The method according to claim 1, wherein the second data source is located within the container.

4. The method according to claim 3, wherein the second data source is an RFID sensor.

5. The method according to claim 1, wherein the at least one condition is an environmental condition.

6. The method according to claim 1, wherein the condition is a battery charge level.

7. The method according to claim 1 further comprising comparing the primary data and secondary data to verify the authenticity of the first data source.

8. The method according to claim 1, wherein the determining step is performed by a scanning device used to capture the primary data and the secondary data.

9. The method according to claim 1 further comprising the step of transmitting the primary and secondary data to a remote computer wherein the remote computer performs the determining step.

10. The method according to claim 1, wherein the steps of retrieving primary data and retrieving secondary data are performed by the same device.

11. The method according to claim 1, wherein the acceptable number of instances is two.

12. A system for capturing primary and secondary data associated with a product in a container, the system comprising:
    a first data source storing primary data and physically associated with the product or container;
    a second data source storing secondary data relating to at least one condition experienced by the product or the container and physically associated with the product or container;
    a scanner device configured to retrieve the primary data from the first data source, and the secondary data from the second data source at substantially the same time; and
    a computing device configured to:
        compare the secondary data against stored rules, wherein the stored rules comprise one or more limits for the at least one condition and define an acceptable number of instances during which the at least one condition transcends at least one of the one or more limits to be at least one;
        determine whether the at least one condition has transcended at least one of the one or more limits;
        determine the number of instances during which the at least one condition has transcended at least one of the one or more limits; and
        in response to a determination that the at least one condition has transcended at least one of the one or more limits on more than the acceptable number of instances during which the at least one condition transcends at least one of the one or more limits, generate and transmit at least one alert.

13. The system according to claim 12, wherein the scanner is capable of reading an RFID sensor and a printed label.

14. The system according to claim 12, wherein the second data source is disposed within the container.

15. The system according to claim 14, wherein the second data source is an RFID sensor.

16. The system according to claim 12, wherein the at least one condition is an environmental condition.

17. The system according to claim 12, wherein the condition is a battery charge level.

18. The system according to claim 12, further configured to compare the primary data and secondary data to verify the authenticity of the first data source.

19. The system according to claim 12, wherein the scanning device determines whether the at least one condition has transcended at least one of the one or more limits.

20. The system according to claim 12, wherein the computer device is remote from the scanner device.

21. The system according to claim 12, wherein the acceptable number of instances is two.

* * * * *